United States Patent [19]

Weiner et al.

[11] 4,079,340

[45] Mar. 14, 1978

[54] UNSTABLE OPTICAL RESONATOR WITH OFF-AXIS NONCENTERED OBSCURATION

[75] Inventors: Melvin M. Weiner, Newton Centre; George W. Sutton, Lexington, both of Mass.

[73] Assignee: Avco Everett Research Laboratory, Inc., Everett, Mass.

[21] Appl. No.: 698,182

[22] Filed: Jun. 21, 1976

[51] Int. Cl.² .............................................. H01S 3/08
[52] U.S. Cl. .............................. 331/94.5 C; 350/299
[58] Field of Search ....................................... 331/94.5

[56] References Cited

U.S. PATENT DOCUMENTS

| | | | |
|---|---|---|---|
| 3,873,942 | 3/1975 | Reilly | 331/94.5 C |
| 3,969,687 | 7/1976 | Freiberg et al. | 331/94.5 C |
| 3,969,688 | 7/1976 | Freiberg et al. | 331/94.5 C |

*Primary Examiner*—William L. Sikes
*Attorney, Agent, or Firm*—Charles M. Hogan; Melvin E. Frederick

[57] ABSTRACT

Herein described is an unstable resonator optical cavity for lasers which may have a square, rectangular or the like spherical concave primary reflection surface at one end of the cavity that intercepts the optical axis of the cavity at or adjacent to one of its corners and a more or less similar square, rectangular or the like spherical convex feedback reflection surface at the opposite end of the optical cavity that intercepts the optical axis at or adjacent to one of its corners arranged and adapted to define an unstable resonator cavity.

9 Claims, 4 Drawing Figures

UNSTABLE OPTICAL RESONATOR WITH OFF-AXIS NONCENTERED OBSCURATION

BACKGROUND OF THE INVENTION

This invention relates to lasers and more particularly to unstable resonator optical cavities for a laser such as a gas laser wherein the laser action takes place and from which an output laser beam emerges.

The cavity optical axis of optical resonators, whether they be stable or unstable resonators, is defined as a line perpendicular to the reflecting surface of both the primary and feedback mirrors. In the absence of medium aberrations, this line is a line through the centers of curvature.

A conventional unstable resonator optical cavity in a laser such as a flowing gas laser includes a primary reflection surface at one end of the cavity and a smaller feedback reflection surface at the other end of the cavity. In the usual aligned configuration, both reflection surfaces are centered on the cavity optical axis. This arrangement is such that any ray of radiation along the optical axis, upon repeated reflection between the primary and feedback reflection surfaces will progressively move away from the optical axis of such conventional resonators and eventually clear the outer edge of the feedback mirror and escape from the cavity as output radiation. In other words, the rays initially along the optical axis will "walk out" of the optical cavity and for this reason, the optical cavity is referred to as an "unstable" cavity or resonator.

The output laser beam from the unstable resonator cavity of the sort described above (if the laser beam is close to equiphase across its cross section), exhibits a characteristic Fraunhofer pattern when its far field is examined in cross section. The characteristic Fraunhofer pattern is produced when a light beam of uniform phase front across the beam is either examined far from its source, or brought to a focus. Further, the total radiation flux or power which can be extracted from the laser medium is a function of the total flux within the optical cavity, the small signal gain coefficient $g_o$, the cavity length, and the optical extraction efficiency $\eta$.

Another unstable resonator cavity that operates more or less the opposite of that described above is disclosed in U.S. Pat. No. 3,873,942.

Briefly, in this type of cavity the feedback mirror, which may assume various configurations, may be disposed along one or more edges of the cavity (for a rectangular cavity) or be annular in shape for a cylindrical cavity. For this type of unstable cavity, the feedback mirror does not intercept and is spaced from the optical axis and the reflection surfaces are shaped to reflect radiation within the cavity which is initially substantially parallel to the cavity axis at the extreme lateral edges of the reflection surfaces so that radiation progressively moves inwardly toward the optical axis until it clears the inside edge of the feedback reflector and escapes from the cavity as output radiation.

For a discussion of an interesting prior art unstable resonator utilizing a plane presumably rectangular primary reflection surface and a convex cylindrical feedback mirror in combination with an objective output lens wherein one side of the output beam just clears an edge of the feedback mirror and the focus of the objective output lens coincides with the imaginary center of the output beam, reference is made to "Solid Laser With a High Spatial Coherence of Radiation", by Yu. A. Anan'ev, et al., published in the Soviet Journal of Quantum Electronics, Vol. 1, No. 4, January-February, 1972.

It can be shown that the laser output power for a given laser peaks at some coupling factor and tapers off to zero on either side of that peak. If it is preferred to operate at the maximum output power, it is usually strived to design the optical cavity to operate at the peak of the curve, because this results in the highest overall efficiency of the laser. However, the maximum power deliverable to a designated spot size in the far field generally occurs for a different coupling factor.

Many laser applications require that the energy of the laser beam be delivered at a distance from the laser, i.e., there be as much energy as possible in the usable portion of the far field pattern. Further, many of such lasers have a transverse spatially non-uniform gain distribution in the optical cavity and utilize an unstable optical cavity.

SUMMARY OF THE INVENTION

In accordance with the invention and in particular, with reference to lasers having a non-uniform gain distribution in an unstable optical resonator cavity, first, maximum power extraction is provided by causing in a rectangular prismatic optical resonator cavity, the high gain portion of the medium to occupy as much as possible of the multi-pass mode volume of the optical resonator cavity and, secondly, locating the feedback mirror such that the obscuration caused by the feedback mirror is located in a corner of the cross section of the optical resonator cavity. The preceding is best achieved if the optical axis of the optical resonator cavity is at least adjacent a corner of each mirror and the reflective surfaces thereof are essentially spherical in configuration. This provides an output aperture with a noncentered obscuration that surprisingly has been found to have more energy within a far-field spot area of given subtended half-angle than output apertures with centered obscurations even if an edge or a portion adjacent an edge of such a centered obscuration intercepts the optical axis. Further, an unstable optical resonator cavity in accordance with the invention has at least comparable mode control, output power, and beam quality as that achieved in on-axis unstable optical cavities.

The shape of the reflecting surfaces may be square, rectangular, rhomboidal or the operational equivalent thereof having at least one corner.

It is an object of the present invention to provide an improved unstable resonator cavity for a laser having primary and feedback mirrors at opposite ends of the cavity.

It is another object of the present invention to provide maximum power extraction for lasers having non-uniform gain distribution.

It is another object of the invention to provide an optical cavity for generating an output laser beam that will be propagated through the atmosphere.

It is another object of the present invention to provide an unstable rectangular prismatic resonator cavity for a laser wherein the optical axis is located adjacent to one corner of the optical cavity.

It is a further object to provide means for increasing the amount of total radiation power in a laser beam contained in a given far field spot size.

It is a further object to provide means for increasing the amount of total power in a laser beam contained in a given far field spot size while at the same time maintaining the coupling coefficient of the feedback mirror such as results in maximum output power from the laser for the conditions of operation of the laser.

These and other objects and features of the present invention will be more apparent from the following description of the specific embodiments which represent the best known uses of the invention.

DESCRIPTION OF EMBODIMENT OF THE INVENTION

Figure 1:
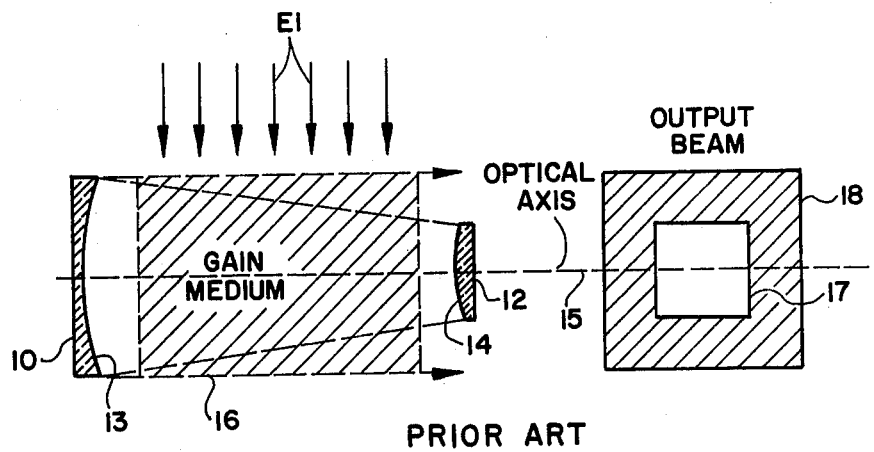
FIG. 1 shows square primary and feedback mirrors of a conventional prior art unstable laser optical cavity wherein the feedback mirror obscures the output laser beam along the optical axis.

Turning now to FIG. 1 there is shown a representation of a conventional square unstable confocal optical resonator cavity for a gas laser. The resonator or optical cavity is defined by the square primary mirror 10 and the square feedback mirror 12. The primary mirror provides a concave reflection surface 13 and the feedback mirror provides a convex reflection surface 14. Square mirrors have been selected solely for convenience of illustration. The centers of curvature of both of these reflective surfaces lie on the optical axis 15 of the cavity. In operation, the medium 16 which may be a gas or a mixture of gases, such as, for example, a mixture of $CO_2$, $N_2$ and He, are pumped by input electrical energy represented as $E_i$ which produces a population inversion of energy states in the gas accompanied by the spontaneous emission of radiation and this radiation is amplified within the medium by laser action. Any ray of the radiation along the axis 15 of the cavity and slightly inclined thereto will reflect back and forth between the primary and feedback reflection surfaces 13 and 14 and in so doing will be amplified and will move away from the axis and escape from the cavity becoming part of the output laser beam. Thus, the ray which begins along the axis of the cavity will "walk" out of the cavity and escape. Clearly, the direction of progressive positions of the ray beginning along the axis 15 is from the axis to the outer periphery of the feedback mirror and escape occurs when the ray is positioned beyond the outer periphery of the feedback mirror. Since every given ray escapes from the optical cavity, the cavity is known as an "unstable" cavity or resonator.

Figure 2:
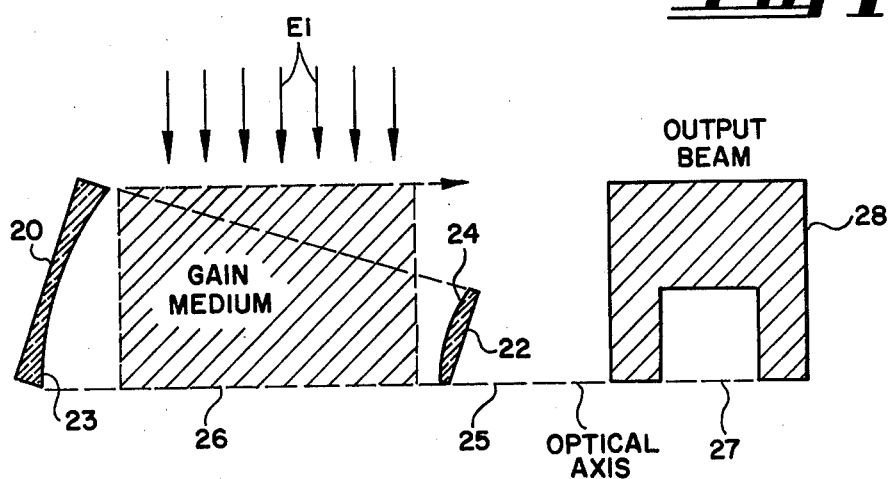
FIG. 2 shows square primary and feedback mirrors of an unstable laser optical cavity wherein the optical axis intercepts an edge of each mirror at the mid points thereof.

FIG. 2 shows a representation of an unstable confocal optical resonator cavity identical to that of FIG. 1 with the exception that one edge each of the primary and feedback mirrors 20 and 22 lie on the optical axis 25 with the optical axis passing midway between the aforementioned edges of the mirrors.

Thus, whereas in FIG. 1 the obscuration 17 of feedback mirror 12 is centered on the optical axis, to define an output beam 18 as shown in FIG. 1, the obscuration 27 of feedback mirror 22 is centered at the lower edge of the output beam 28 of FIG. 2.

FIG. 1 shows a typical "on-axis" resonator and FIG. 2 shows an "Off-axis" resonator.

An "on-axis" resonator is herein defined as a resonator whose optical axis, as shown in FIG. 1, determined by the line through the centers of curvature of the resonator mirrors, is through the centers of the resonator mirrors. In such a case, the obstructed portion of the output beam is at the center of the output beam as shown in FIG. 1. A confocal unstable on-axis resonator is shown in FIG. 1 and is seen to be identical to conventional "aligned" confocal unstable resonators. It has been found that on-axis resonators give maximum power extraction when the gain distribution is symmetric about the center of the gain medium with a maximum at the center of the gain medium.

If the cavity mirrors are tilted so that the optical axis is not through the centers of the mirrors as shown in FIG. 2, then such a resonator is defined as an "off-axis" resonator. A confocal unstable off-axis resonator is shown in FIG. 2 for the case where the optical axis passes through the edges of the resonator mirrors. If $\rho_{oa}$ is the distance between the center of the feedback mirror and the point A of intersection of the optical axis with the feedback mirror, normalized by the distance between the center of the feedback mirror and the edge of the feedback mirror, then FIGS. 1 and 2 correspond to the cases A = 0 and $\mu_{oa}$ = 1. FIGS. 1 and 2 may therefore be denoted as corresponding to a 0 and 100% off-axis resonators respectively. An off-axis resonator differs from a misaligned on-axis resonator in that the optical mode of the off-axis resonator fills the gain medium. It has also been found that a $\mu_{oa}$ off-axis resonator gives maximum power extraction when the gain distribution is monotonic increasing towards the point $\mu_{oa}$ of the gas medium.

Figure 3:
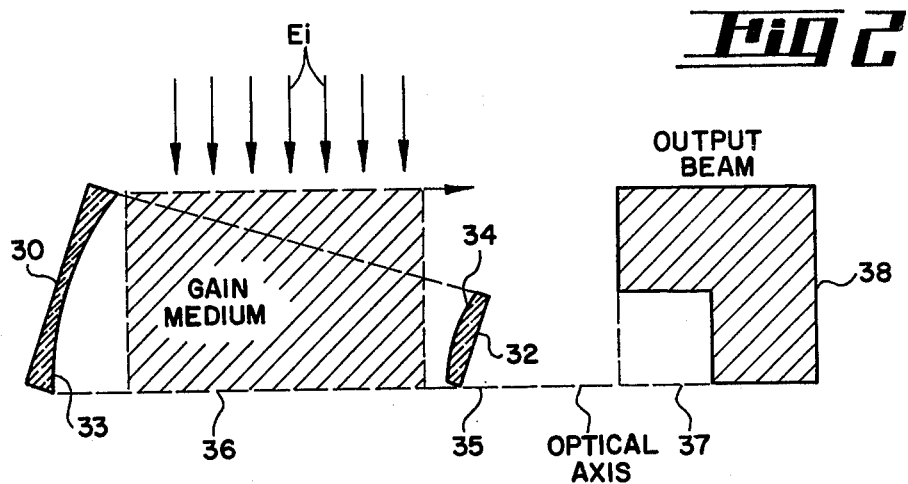
FIG. 3 shows square primary and feedback mirrors of an unstable laser optical cavity wherein the optical axis intercepts a corner of each mirror.

FIG. 3 shows a representation of an unstable confocal resonator cavity identical to that of FIG. 2 with the exception that one corner each of the primary and feedback mirrors 30 and 32 lie on and are perpendicular to the optical axis 35 to provide an output beam 38 wherein the obscuration 37 of feedback mirror 32 is located at one corner of the output beam.

A resonator cavity having mirrors as shown in FIG. 3 may be defined as a "corner off-axis" resonator cavity.

Figure 4:
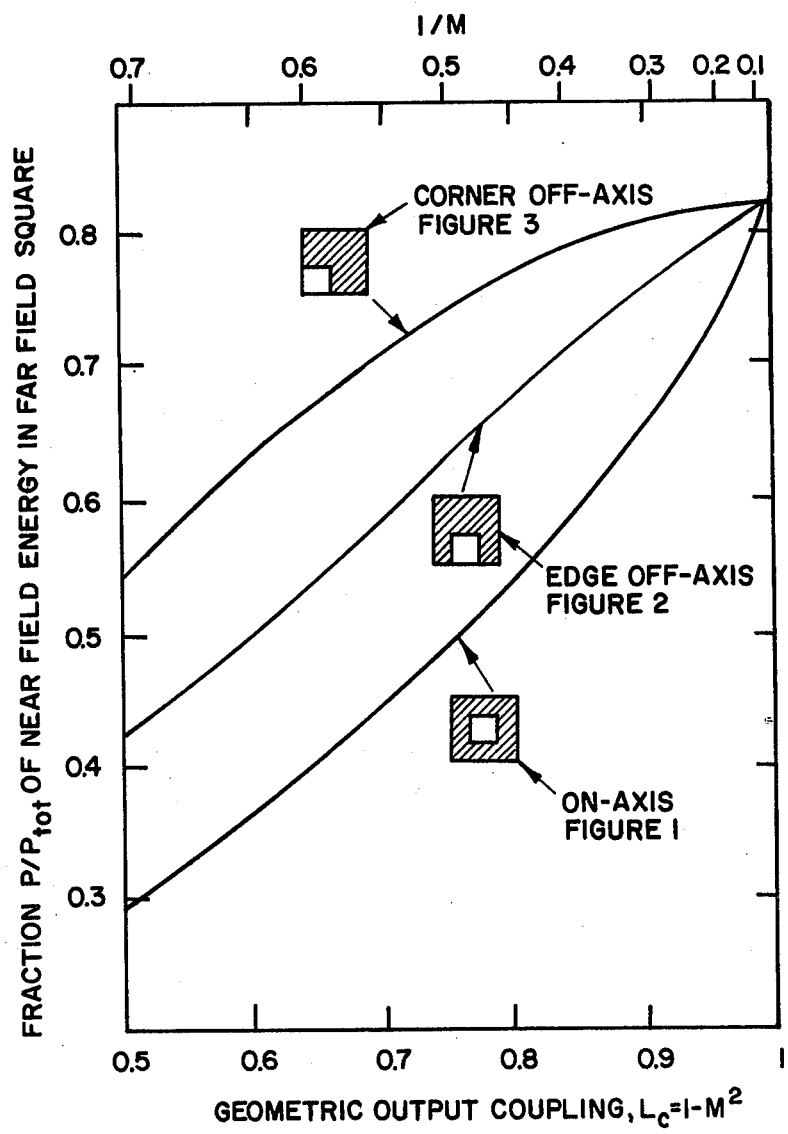
FIG. 4 shows the energy within the first Airy square for output apertures of the type shown in FIGS. 1, 2 and 3.

To permit a better understanding of the surprising results obtained with corner off-axis geometries as shown in FIG. 3, attention is now directed to FIG. 4 which shows a comparison of the energy within the first Airy square for output apertures of beams as shown in FIGS. 1, 2 and 3.

As may be readily seen by inspection of FIG. 4, while the energy within a first Airy square for an off-axis geometry oF FIG. 2 is significantly greater than that for an on-axis geometry as shown in FIG. 1, the energy is even significantly greater for the geometry of FIG. 3 than that for FIG. 2.

A remarkable effect of the corner off-axis geometry of FIG. 3 is that for values of 1/M (where M is the mode magnification) such that 0 < 1/M < 0.28, the energy in the first dark square can be made actually greater by about 0.5% than that for an unobscured aperture.

Output apertures or beams with corner off-axis obscurations as shown in FIG. 3 unexpectedly diffract less energy into the far field side lobes and more energy into a given far-field spot size centered about the central main lobe than output apertures with centered apertures as shown, for example, in FIGS. 1 and 2. The configuration of FIG. 3 permits improvements in practical applications by simultaneously suppressing unwanted side lobes and increasing the energy within the desired slot size centered about the main lobe.

As used in the claims, the term "rectangular reflection surface" includes the operation equivalent thereof having at least one corner.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. An optical unstable resonator cavity for receiving a gain medium and having an optical axis, said cavity comprising:
    a. a primary reflection surface having a first center of curvature; and
    b. a feedback reflection surface having at least one corner forming part of a feedback mirror and a second center of curvature different from said first center of curvature and spaced from said primary reflection surface and in combination with said primary reflection surface defines said optical unstable resonator cavity, said reflection surfaces being disposed and oriented with respect to each other whereby the multi-pass mode volume of said optical cavity occupies at least the majority of the gain medium and so that said centers of curvature are positioned along a common axis constituting said optical axis, said optical axis passing at least adjacent to said corner of said feedback reflection surface and at least adjacent to said primary reflection surface.

2. An optical unstable resonator cavity as in claim 1 wherein said primary and feedback reflection surfaces are rectangular.

3. An optical unstable resonator cavity as in claim 1 wherein both reflection surfaces are spherical.

4. An optical unstable resonator cavity as in claim 1 wherein both said reflection surfaces intersect said optical axis at their corners and are at least substantially perpendicular to said optical axis.

5. An optical unstable resonator cavity as in claim 3 wherein both said reflection surfaces intersect said optical axis at their corners and are substantially perpendicular to said optical axis.

6. An optical unstable resonator cavity as in claim 5 wherein both said reflection surfaces are substantially square.

7. An optical unstable resonator cavity as in claim 2 wherein both said reflection surfaces are spherical, said primary reflection surface being spherical concave and said feedback surface being spherical convex.

8. An optical unstable resonator cavity as in claim 7 wherein said reflection surfaces intersect said optical axis at their corners and are substantially perpendicular to said optical axis.

9. In a laser including an optical unstable resonator cavity for receiving a gain medium and having an optical axis, the combination comprising:
    a. a rectangular primary mirror having a rectangular spherical concave primary reflecting surface at one end of said cavity and having a first center of curvature; and
    b. a rectangular feedback mirror smaller than said primary mirror and having a rectangular spherical convex feedback surface at the other end of said cavity and in combination with said primary reflecting surface defines said optical unstable resonator cavity, said spherical convex feedback surface having a second center of curvature different from said first center of curvature, said reflection surfaces being disposed and oriented with respect to each other whereby the multi-pass mode volume of said optical cavity occupies at least the majority of the gain medium and so that said centers of curvature are positioned along a common axis constituting said optical axis, said optical axis passing at least adjacent to said corner of said feedback reflection surface and at least adjacent said primary reflection surface.

* * * * *

UNITED STATES PATENT AND TRADEMARK OFFICE
CERTIFICATE OF CORRECTION

PATENT NO. : 4,079,340
DATED : March 14, 1978
INVENTOR(S) : Melvin M. Weiner and George W. Sutton It is certified that error appears in the above-identified patent and that said Letters Patent are hereby corrected as shown below:

Column 4, line 29, cancel "A = 0" and insert therefor -- $\rho_{oa} = 0$ --; Column 4, line 29, cancel "$\mu_{oa} = 1$" and insert therefor -- $\rho_{oa} = 1$ --; Column 4, line 34, cancel "$\mu_{oa}$" and insert therefor -- $\rho_{oa}$ --; Column 4, line 36, cancel "$\mu_{oa}$" and insert therefor --A--; Column 4, line 37, cancel "gas" and insert therefor --gain--; and Column 5, line 5, cancel "slot" and insert therefor --spot--.

Signed and Sealed this

Sixth Day of March 1979

[SEAL]

Attest:

RUTH C. MASON
*Attesting Officer*

DONALD W. BANNER
*Commissioner of Patents and Trademarks*